US009455895B2

(12) United States Patent
Christenson et al.

(10) Patent No.: US 9,455,895 B2
(45) Date of Patent: Sep. 27, 2016

(54) DATA LINK LAYER SWITCH FRAME FORWARDING ANALYSIS

(71) Applicant: International Business Machines Corporation, Armonk, NY (US)

(72) Inventors: David A. Christenson, Fergus Falls, MN (US); Josep Cors, Rochester, MN (US); Ward R. Nelson, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 13/743,495

(22) Filed: Jan. 17, 2013

(65) Prior Publication Data

US 2014/0198668 A1    Jul. 17, 2014

(51) Int. Cl.
*H04L 12/26* (2006.01)
*H04L 12/939* (2013.01)

(52) U.S. Cl.
CPC ............. *H04L 43/10* (2013.01); *H04L 43/026* (2013.01); *H04L 43/50* (2013.01); *H04L 49/55* (2013.01)

(58) Field of Classification Search
CPC ....... H04Q 1/20–1/26; H04Q 3/0083–3/0087; H04Q 3/54575–3/54591; H04Q 11/045; H04B 17/0017–17/0027; H04L 43/026; H04L 43/12; H04L 43/50; H04L 49/55–49/557; H04L 49/70

USPC .............. 370/244, 250–251; 714/25, 27–28, 714/31–33, 36, 39, 43
See application file for complete search history.

(56) References Cited

U.S. PATENT DOCUMENTS

| | | | |
|---|---|---|---|
| 7,639,627 B1 | 12/2009 | Ye et al. | |
| 2003/0191590 A1* | 10/2003 | Narayan et al. | ................ 702/68 |
| 2007/0223388 A1* | 9/2007 | Arad et al. | .................... 370/252 |
| 2008/0005782 A1 | 1/2008 | Aziz | |
| 2009/0028131 A1* | 1/2009 | Chowdhury et al. | ......... 370/352 |
| 2009/0174273 A1* | 7/2009 | Watanabe et al. | ....... 310/156.53 |
| 2009/0175273 A1* | 7/2009 | Guan | ........................... 370/390 |
| 2010/0110906 A1* | 5/2010 | Ram | ...................... H04L 43/50 370/252 |
| 2011/0069620 A1* | 3/2011 | Gintis et al. | .................. 370/250 |
| 2013/0301419 A1 | 11/2013 | Sandu et al. | |
| 2014/0029451 A1* | 1/2014 | Nguyen | ....................... 370/252 |

OTHER PUBLICATIONS

IBM Patent Application entitled "Data Link Layer Analysis With Packet Trace Replay" filed Jan. 17, 2013 by David A. Christensen et al.

* cited by examiner

*Primary Examiner* — Michael Thier
*Assistant Examiner* — Eric Myers
(74) *Attorney, Agent, or Firm* — Toler Law Group, P.C.

(57) ABSTRACT

Systems and methods to analyze layer-2 data frame switch forwarding are provided. A first switch may be coupled to a second switch. The first switch may maintain state information mirroring the state of the second switch. A sequence number may be appended to a data frame that is received at the first switch. Forwarding compliance of the second switch may be determined by analyzing a runtime attribute of the first switch.

20 Claims, 13 Drawing Sheets

DATA LINK LAYER SWITCH FRAME FORWARDING ANALYSIS

I. FIELD OF THE DISCLOSURE

The present disclosure relates generally to data communication in a networked computing system, and more particularly, to testing the connectivity and responsiveness associated with data frame forwarding in a computing network.

II. BACKGROUND

Problems arising in the data link layer (layer-2) of the Open Systems Interconnection (OSI) model of a network can result in degraded communications. Layer-2 switches use hardware address tables to selectively forward data frames to appropriate destination ports. Verifying that a data frame was forwarded to the appropriate port requires an in depth understanding of Institute of Electrical and Electronics Engineers (IEEE) 802.3 standards. This burden is exponentially increased where large numbers of switching tests must be performed or customized tests are desired.

III. SUMMARY OF THE DISCLOSURE

According to a particular embodiment, an apparatus may include a test case module configured to transmit a data frame and a first switch including a first port. A second switch may include a second port coupled to the first port. The second switch may be configured to receive the data frame from the test module, to monitor a state of the first switch, and to determine a runtime attribute associated with forwarding the data frame.

According to another embodiment, a method of analyzing a data frame switch operation may include receiving a data frame at first switch from a test case module. A frame sequence number may be appended to the data frame, and the frame sequence number may be used to verify forwarding compliance of the second switch. The frame sequence number may include a checksum or any signature used to uniquely identify a data frame and may be appended to the end of the data frame or inserted anywhere in the payload of the data frame.

According to another embodiment, a program product may include program code configured to receive a data frame at a first switch from a test case module, to append a frame sequence number to the data frame, and to use the frame sequence number to verify forwarding compliance. A computer readable medium may bear the program code.

Features and benefits that characterize embodiments are set forth in the claims annexed hereto and faulting a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

Figure 10A:
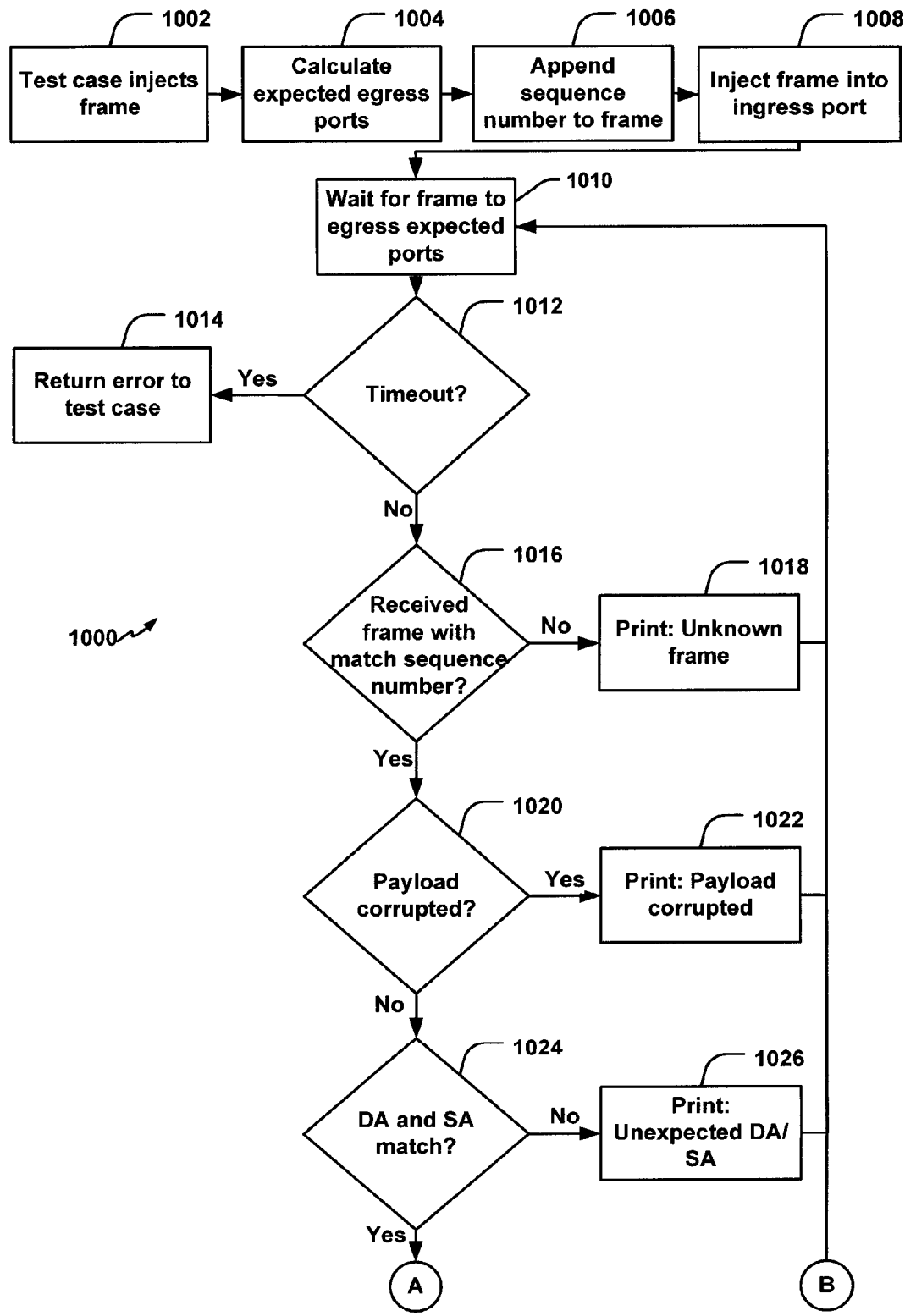
Figure 11:
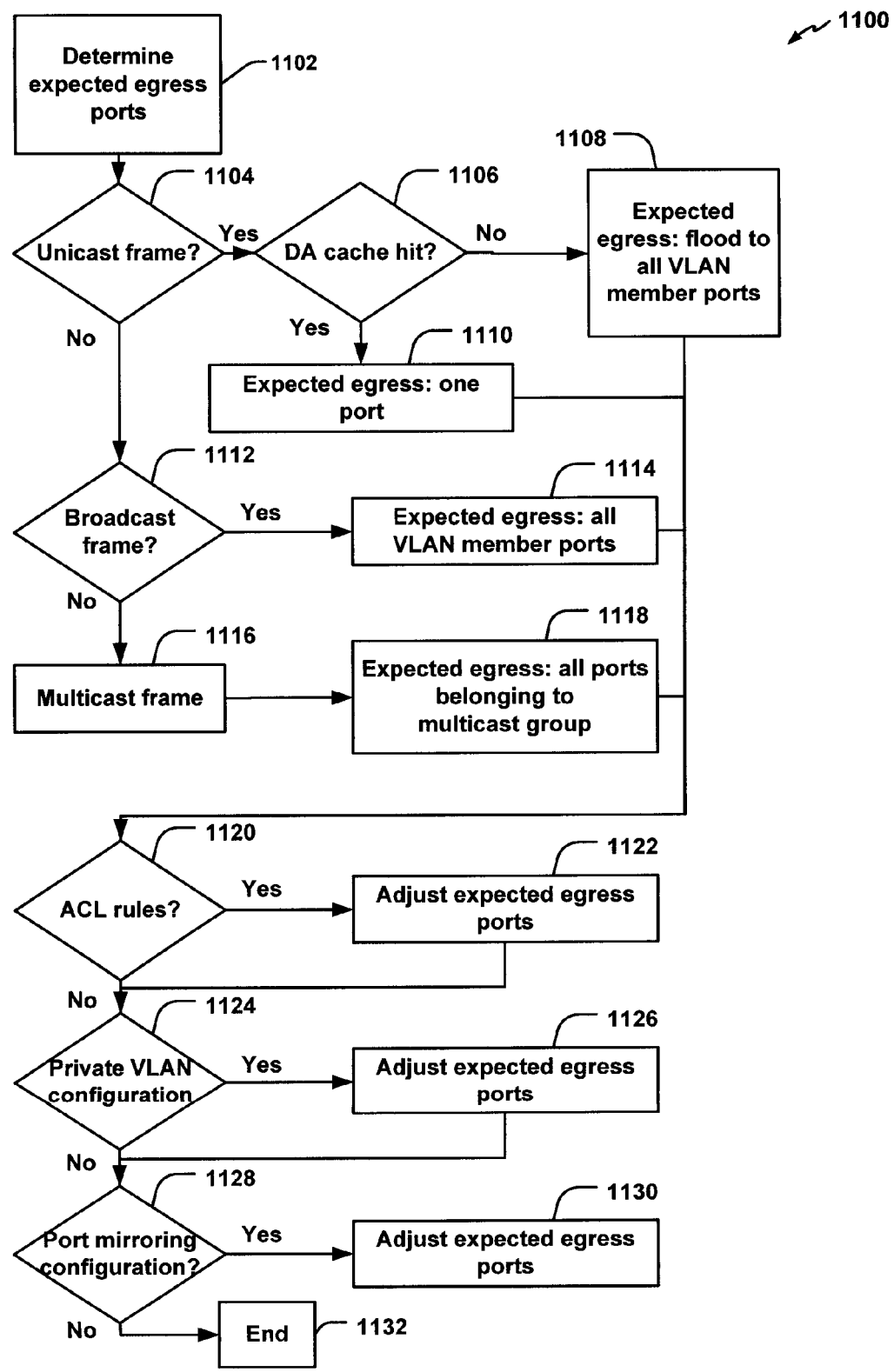
Figure 12:
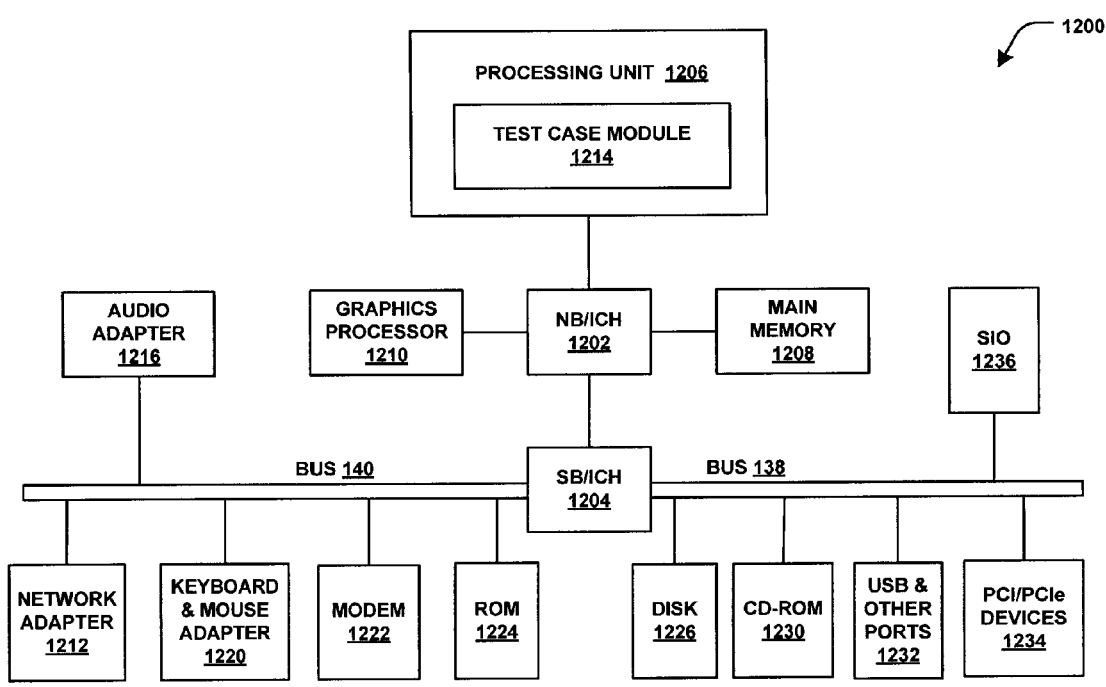

FIGS. 10a and b show a flowchart of an embodiment of a method of monitoring and analyzing data frame switching;

FIG. 11 is a flowchart of an embodiment of a method of determining expected egress ports; and FIG. 12 is a block diagram of a computing apparatus including software and hardware to monitor and verify switch frame delivery in a manner consistent with an embodiment.

V. DETAILED DESCRIPTION

A particular embodiment may offload the test case protocol knowledge into a mirror switch. The mirror switch may mirror the state of the layer-2 switch under test and may execute the Institute of Electrical and Electronics Engineers (IEEE) 802.3 standard in parallel with the layer-2 switch under test. Both switches may be configured identically or nearly identically, and the ports may be connected. The layer-2 switch under test may be running in a hardware device or a simulator. The mirror switch ports may be connected via Ethernet cables when testing a hardware device or a virtual device (e.g., a TAP device) when testing in a simulator.

An embodiment may simplify IEE 802.3 test case writing while providing accurate comprehensive layer-2 forwarding verification. Sequence numbers may be appended to the end of each frame to uniquely identify an egress frame. The embodiment of a system may verify access control list (ACL) functionality, verify a forwarding rate, and recognize aggregated links/ports. The embodiment may further verify that only one frame egresses a trunk, and implements a multicast snooper to learn multicast groups.

Test cases may be written to inject any Ethernet frame into the layer-2 switch under test to validate compliance. The actual verification may be done by the redundant, layer-2 mirror switch and not the test case, itself. The mirror switch may verify that the layer-2 switch complies with the IEEE layer-2 forwarding standard. The mirror switch may run in a standalone Linux server or a simulator, such as Simics. The mirror switch may have a verification port paired with each of the layer-2 switch ports under test. The verification port may be directly cabled to the switch port or tapped using a virtual TAP device.

The mirror switch may enable the configuration of ports, trunks, VLANs, and other layer-2 configuration objects. The mirror switch may keep track of the switch state so that the mirror switch may verify the compliance of the layer-2 switch. The mirror switch may inject data frames into a selected verification port. The mirror switch may append a sequence number to the end of each data frame to uniquely identify the data frames as the data frames egress switch ports. The mirror switch may verify that egress data frames are correctly tagged or untagged as specified by the switch configuration. The mirror switch may maintain an ACL and verify that the layer-2 switch does not forward that match a drop action. The mirror switch may verify that aggregated ports are treated as one logical link. For example, the mirror switch may verify that a particular data frame egresses only one member of an aggregated link, or trunk. The mirror switch may perform multicast snooping to dynamically learn multicast groups and validate compliance.

The mirror switch may also verify that each injected data frame is forwarded to the appropriate switch port or ports. A unicast data frame may be flooded if the destination address of the unicast data frame has not yet been learned. Otherwise, the unicast data frame may be forwarded to the appropriate switch port. Broadcast data frames may be broadcast to all members of the VLAN. Multicast data frames may be flooded if a multicast snooper has not received any Internet group management protocol (IGMP) membership frames. Otherwise, multicast data frames may be forwarded to members of a multicast group.

The mirror switch may be configured to mirror the state of the layer-2 switch under test. The mirror switch may go through the same states as the layer-2 switch. Test case configures the mirror switch identically to the layer-2 switch. For example, all protocols being tested on the layer-2 switch may also be present on the mirror switch. Based on the current configuration, the mirror switch may calculate what the expected results should be and what the expected egress ports should be. The payloads should be identical, as well. In this manner, the mirror switch may simplify layer-2 analysis by automatically making available expected results for a given configuration.

Embodiments of the switching and analysis system may be realized in hardware, software, or in any combination thereof. In one example, different components, such as the ports, may be distributed. Either or both of the layer-2 switch and the mirror switch may be hardware in one embodiment, and software in another. The terms, "frame" and "packet," may be used interchangeably throughout this description.

Figure 1:
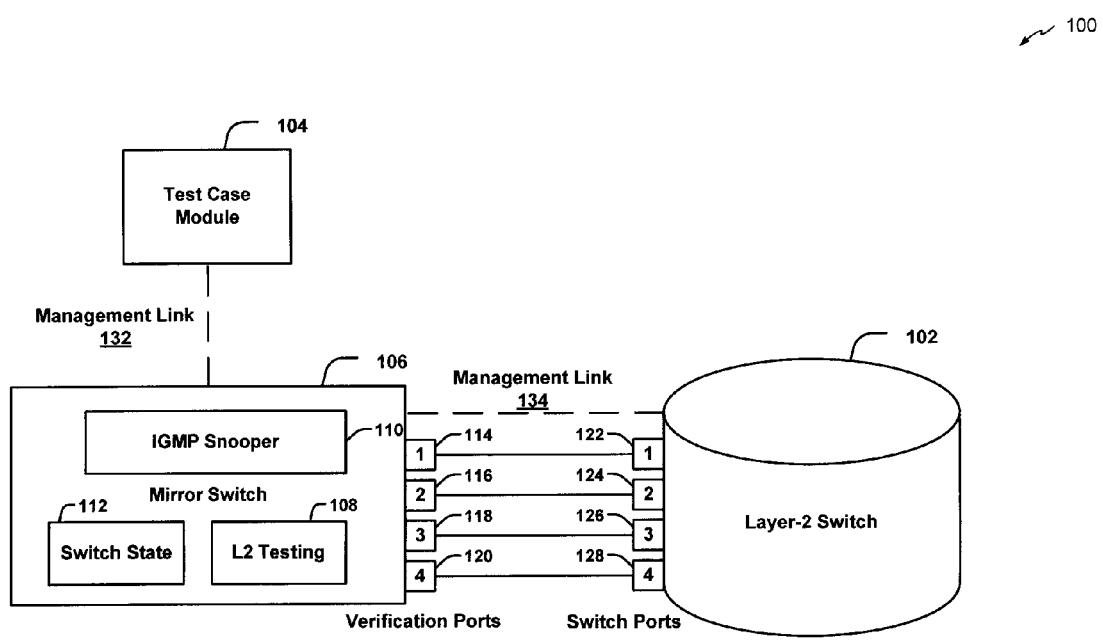
FIG. 1 is a block diagram of an embodiment a computing system configured to monitor and analyze data frame switching processes according to an embodiment.

Turning more particularly to the drawings, FIG. 1 shows an embodiment of a computing system 100 configured to monitor and analyze data frame switching processes. The system 100 may include a layer-2 (L2) switch 102 that receives data (e.g., commands) from a test case module 104 forwarded through a mirror switch 106, or test switch.

The test case module 104 may be a program configured to output configuration commands. The test case module 104 may be in communication with the mirror switch 106 via a management link 132. The mirror switch 106 may be identical or nearly identical to the layer-2 switch 102. The layer-2 switch 102 may be the switch under test (SUT). The layer-2 switch 102 may be implemented in hardware or in a simulator, such as Simics.

The mirror switch 106 may generally be configured to emulate and analyze the data frame switching processes of the layer-2 switch 102. The mirror switch 106 may be realized in either hardware or software. The mirror switch 106 may include a layer-2 (L2) testing module 108, an Internet group management protocol (IGMP) snooper module 110, and a switch state 112. The L2 testing module 108 may comprise software or firmware executable to monitor and verify data frame transmission. The IGMP snooper module 110 may be configured to learn multicast groups. The switch state 112 may indicate the state of the layer-2 switch 102. The mirror switch 106 may further include verification ports 114, 116, 118, 120 that are coupled to switch ports 122, 124, 126, 128 of the layer-2 switch 102. A management link 134 may enable configuration commands and related communications between the mirror switch 106 and the layer-2 switch 102.

Figure 2:
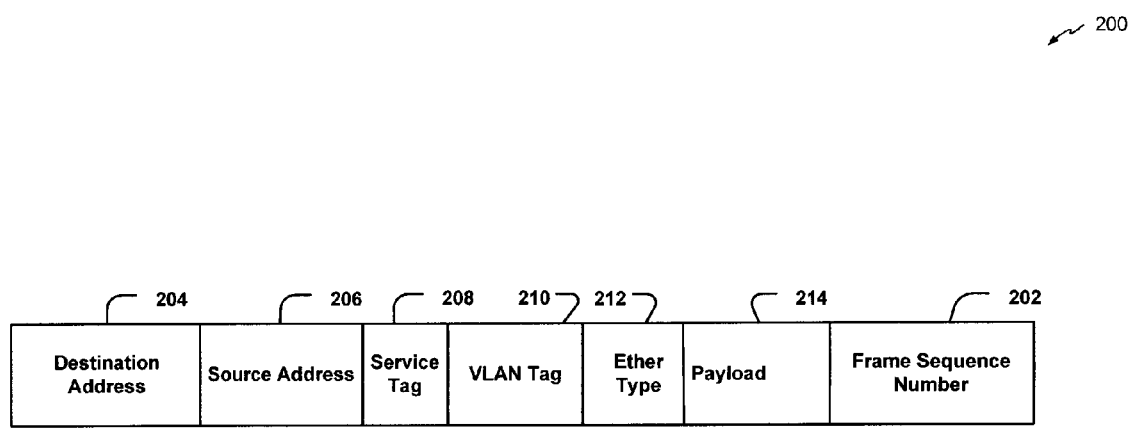
FIG. 2 illustrates an embodiment of a data frame that may be processed by the computing system of FIG. 1.

FIG. 2 illustrates an embodiment of a data frame 200. The data frame 200 may be uniquely identified by a sequence number 202. The data frame 200 may additionally include a destination address 204 and a source address 206. A service tag, or S-tag, 208, a virtual local area network (VLAN) tag 210, an Ether Type 212, and a payload 214 may also be included in the illustrative data frame 200.

The sequence number 202 may be appended to the end of each data frame before the data frames are injected into a verification of a mirror switch (and a switch port of a layer-2 switch). The sequence number 202 may be used to uniquely identify the data frame 200. When the data frame 200 egresses a port, the sequence number 202 may be analyzed to see if it is the expected sequence number 202. As discussed herein, other characteristics, such as the payload 214 and the source address 206, may additionally be verified. A properly functioning layer-2 switch may not alter data appended after the payload 214. The frame sequence number 202 may uniquely identify the data frame 200 as the data frame 200 egresses switch ports. The frame sequence number 202 may also be used as a human readable identifier to aid in diagnosing bugs in the layer-2 switch.

Figure 3:
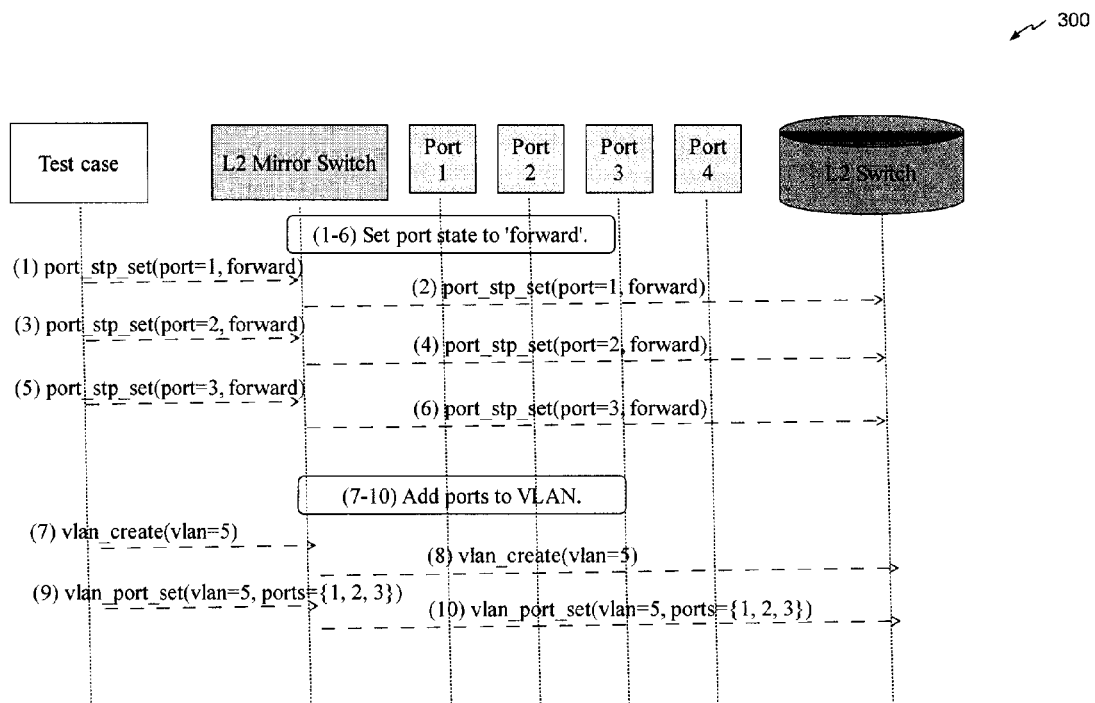
FIG. 3 is a timing diagram illustrating how a layer-2 switch under test may be configured according to an embodiment.

FIG. 3 is a timing diagram 300 illustrating how a layer-2 switch (SUT) may be configured according to an embodiment. The method is illustrated in terms of the interaction between a test case module, a mirror switch, ports 1-4, and a layer-2 switch under test. For illustration purposes, the test case module 104, the mirror switch 106, the switch ports 1-4 (122, 124, 126, 128), and the layer-2 switch 102 may be similar to those shown in FIG. 1. More particularly, processes 1-6 may set the spanning tree protocol (STP) state to forward to enable network traffic to flow on the switch ports. The forward state may be a command used to configure the switch. Other illustrative commands configured to set a state of the switch may include a command that enables or disables the transmission and reception of packets on a physical port. Another command may set the 802.1X authorization status of a port. Commands of other embodiments may set the service tag for a logical port, set port membership for a VLAN, private VLAN, or a trunk (i.e., link aggregation group). Another command may add static energy to a forwarding cache or may enable port mirroring for a physical port. Still other commands may define an ACL rule to override source address learning, to discard a particular type of packet, or to override VLAN filtering. As such, a state of a switch may be initiated in response to a command affecting switch configuration and forwarding processes.

Processes 7-10 may add ports to a VLAN to establish a broadcast domain. One skilled in the art will appreciate that embodiments may be extended to test multiple complex switch configurations. Identical configurations may be stored in both the mirror switch and the layer-2 switch.

Figure 4:
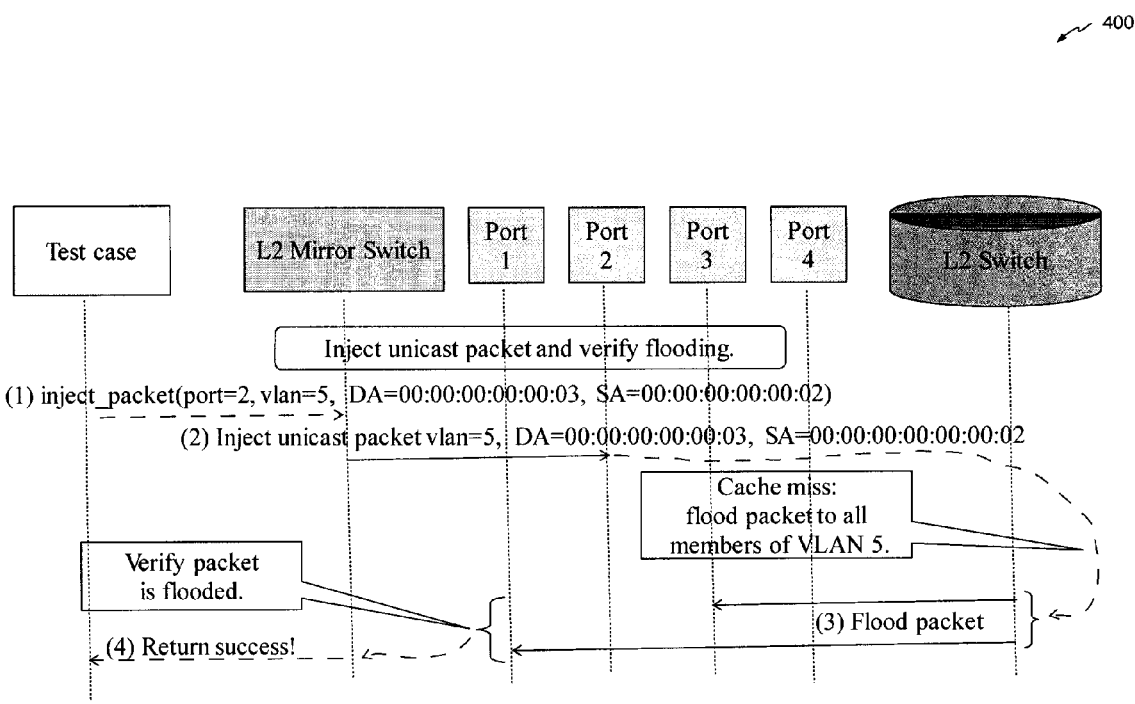
FIG. 4 is a timing diagram illustrating how an embodiment of a unicast data frame may be flooded as if it were a broadcast data frame.

FIG. 4 shows a timing diagram 400 illustrating how an embodiment of a unicast data frame may be flooded as if it were a broadcast data frame. Broadcast frames may be configured to be transmitted to every single port that is a member of a local area network. The method is illustrated in terms of the interaction between a test case module, a mirror switch, ports 1-4, and a layer-2 switch under test. For illustration purposes, the test case module 104, the mirror switch 106, the ports 1-4 (114, 116, 118, 120), and the layer-2 switch 102 may be similar to those shown in FIG. 1.

More particularly, the test case module may inject at 1 a unicast data frame into the port 2. The mirror switch may inject at 2 the unicast data frame into the verification port 2. The verification port 2 may be connected to the switch port 2. At 3, the layer-2 switch may not find the destination address in its forwarding cache, so the layer-2 switch may flood the unicast data frame to the other members of the VLAN. The mirror switch at 4 may verify that the unicast data frame is flooded to all the other member of the VLAN. The layer-2 switch may additionally return a successful return code to the test case.

Figure 5:
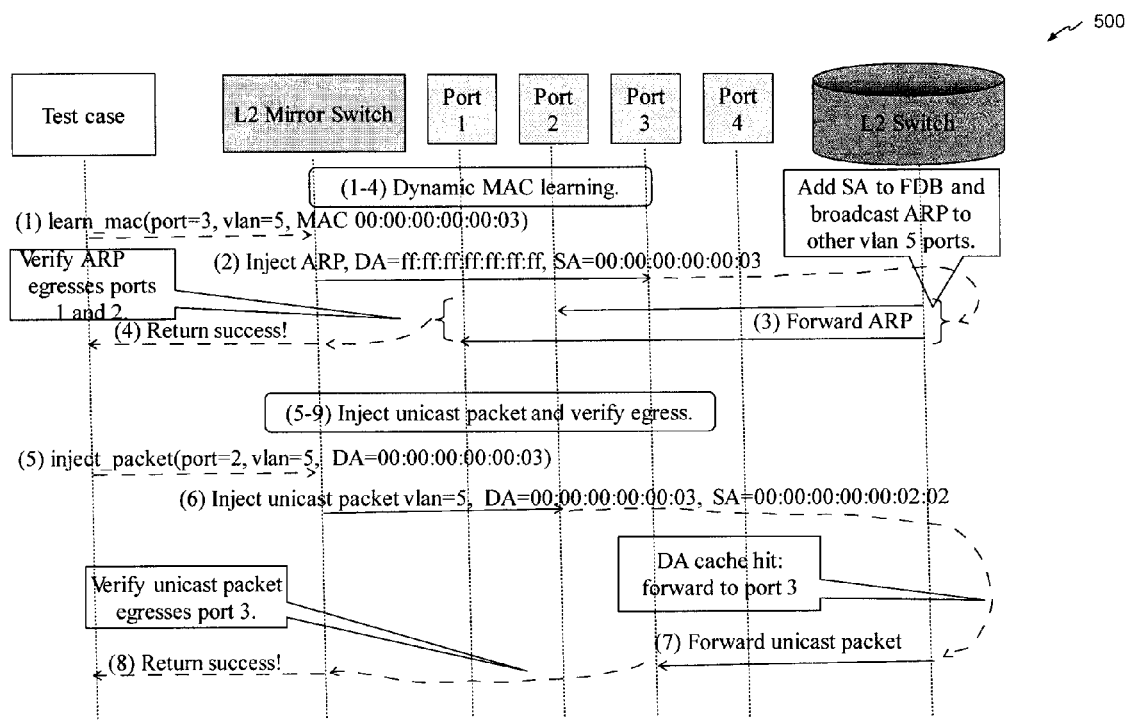
FIG. 5 is a timing diagram illustrating Media Access Control (MAC) address learning for a unicast data frame according to an embodiment.

FIG. 5 shows a timing diagram 500 illustrating an embodiment of a method of MAC address learning for a unicast data frame. The method is illustrated in terms of the interaction between a test case module, a mirror switch, ports 1-4, and a layer-2 switch under test. For illustration purposes, the test case module 104, the mirror switch 106, the ports 1-4 (114, 116, 118, 120), and the layer-2 switch 102 may be similar to those shown in FIG. 1.

Processes 1-4 of FIG. 5 show how a media access control (MAC) address is dynamically learned. More particularly, the test case module may call at 1 the learn_mac application programming interface (API) to cause MAC 00:00:00:00:00:03 to be learned on port 3. A gratuitous address resolution protocol (ARP) frame may be created at 2 with source address 00:00:00:00:00:03 at 3. The ARP frame may be injected into port 3. The layer-2 switch may add 00:00:00:00:00:03, port 3 to its forwarding cache, and may broadcast the ARP frame on all other members of the VLAN. Process 4 may include the mirror switch verifying that the ARP frame egresses all the switch ports except source port 3.

Processes 5-9 of FIG. 5 show the forwarding of unicast data frame when its destination address has been previously learned. More specifically, the test case module at 5 may inject a unicast data frame with destination address 00:00:00:00:00:03 into port 2. The unicast data frame may be injected into port 2 at 6. The layer-2 switch may locate destination address DA 00:00:00:00:00:03 in its forwarding cache at 7 and may forward the unicast data frame to port 3 (no need to flood). At 8 of FIG. 5, the mirror switch may verify that the unicast data frame only egresses port 3 and may return a successful return code to the test case. Where the unicast data frame had also egressed port 1, the layer-2 would be non-compliant and an error return code would be returned to the test case.

Figure 6:
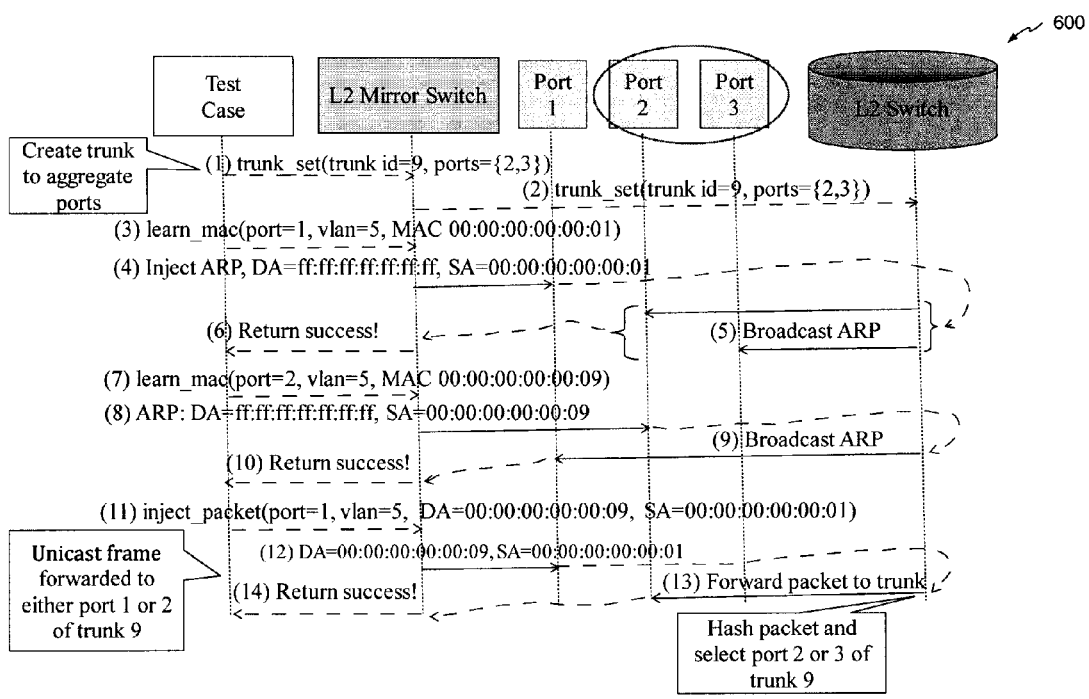
FIG. 6 is a timing diagram illustrating a method of link aggregation that may be performed according to an embodiment.

FIG. 6 shows a timing diagram 600 illustrating a method of link aggregation that may be performed according to an embodiment. The method is illustrated in terms of the interaction between a test case module, a mirror switch, ports 1-4, and a layer-2 switch under test. For illustration purposes, the test case module 104, the mirror switch 106, the ports 1-4 (114, 116, 118, 120), and the layer-2 switch 102 may be similar to those shown in FIG. 1.

The test case module may at 1 create a trunk 9 that includes member ports 2 and 3 such that the ports are treated as a single logical link. The mirror switch may configure trunk 9 at 2 on the layer-2 switch that includes member ports 2 and 3. The test case module at 3 may call the learn_mac API to cause MAC 00:00:00:00:00:01 to be learned on port 1. The mirror switch may at 4 inject a gratuitous ARP frame with source address 00:00:00:00:00:01 into port 1. The mirror switch at 5 may add MAC 00:00:00:00:00:01, port 1 to its forwarding cache and may broadcast the ARP frame to all the other VLAN member ports. At 6, the mirror switch may verify that the ARP frame egresses all the VLAN member ports except port 1. The test case module at 7 may call the learn_mac API to cause MAC 00:00:00:00:00:09 to be learned on trunk 9.

The mirror switch may at 8 inject a gratuitous ARP frame with source address 00:00:00:00:00:09 into port 2. Injecting the ARP into port 3 may have had the same effect, since both ports 2 and 3 belong to trunk 9. The layer-2 switch may at 9 add MAC 00:00:00:00:00:09, trunk 9 to its forwarding cache and may broadcast the ARP frame to all the other VLAN member ports. At 10, the mirror switch may verify that the ARP frame egresses all the VLAN member ports, except ports 2 and 3 (trunk 9 member ports). The test case module at 11 may call the inject_packet API to inject a unicast data frame with DA 00:00:00:00:00:09 into port 1. The mirror switch may inject at 12 the unicast data frame into port 1. The layer-2 switch may locate MAC 00:00:00:00:00:09, trunk 9 in its forwarding cache and use the default hashing algorithm to select trunk member port 2 and to forward the unicast data frame to port 2. It is possible that trunk member port 3 may have been selected. At 14, the mirror switch may verify that the unicast data frame is forwarded to either member ports of trunk 9 and may return a successful return code to the test case.

Figure 7:
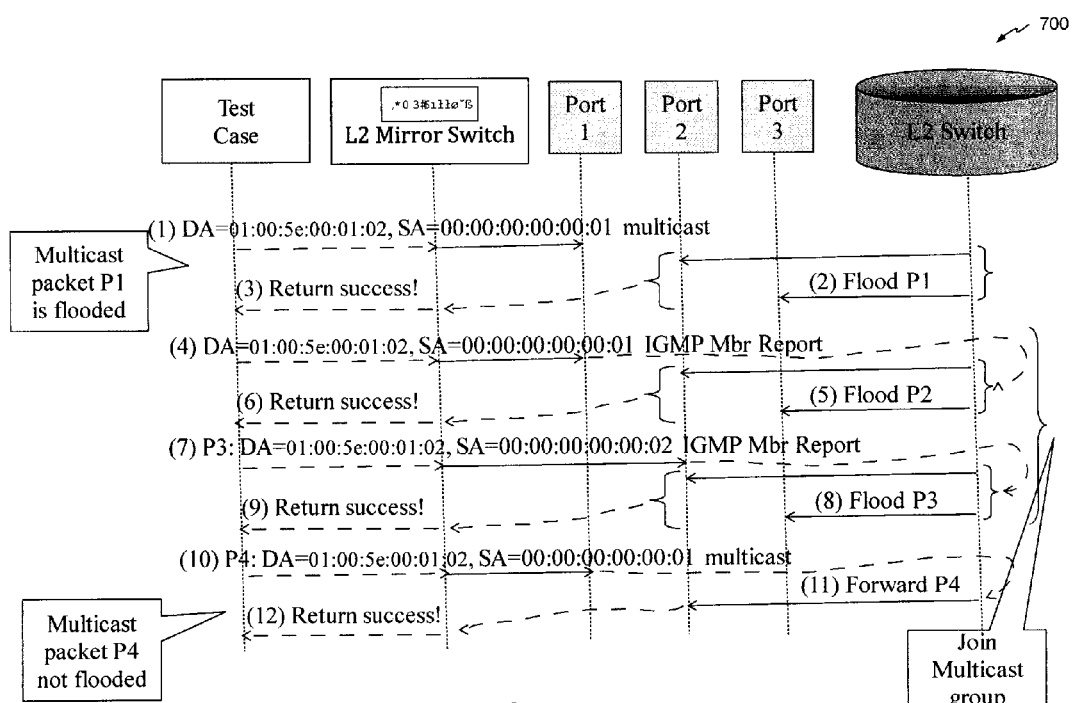
FIG. 7 is a timing diagram illustrating a method of addressing multicast frames using multicast snooper according to an embodiment.

FIG. 7 is a timing diagram 700 illustrating a method of addressing multicast frames using a multicast snooper according to an embodiment. The method is illustrated in terms of the interaction between a test case module, a mirror switch, ports 1-4, and a layer-2 switch under test. For illustration purposes, the test case module 104, the mirror switch 106, the ports 1-4 (114, 116, 118, 120), and the layer-2 switch 102 may be similar to those shown in FIG. 1. Processes 1-3 show multicast flooding prior to learning a multicast group. Processes 4-9 of FIG. 7 show how the multicast snooper may learn the multicast group from IGMP Membership Report frames. Processes 10-12 illustrate a multicast frame sent to only the ports that belong to the multicast group.

Figure 8:
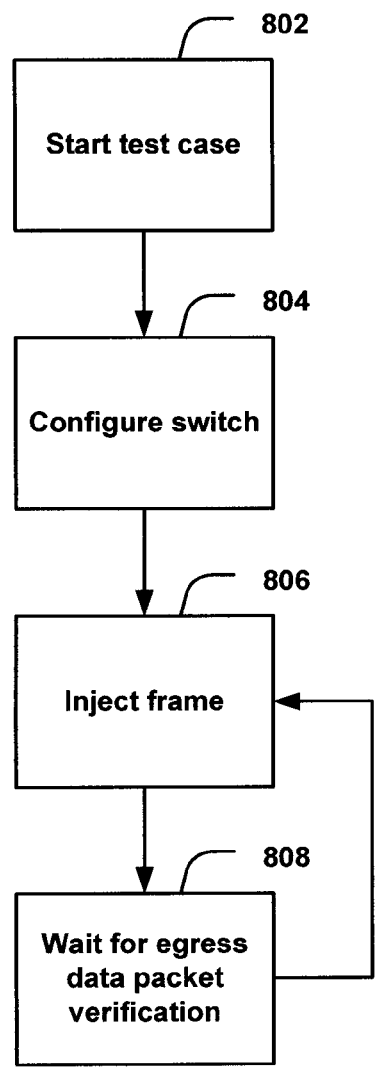
FIG. 8 is a flowchart of an embodiment of a method of verifying that a data frame correctly egresses.

Referring to FIG. 8, a particular embodiment of a method 800 of verifying a runtime attribute, such as a data frame egress, is illustrated. The method 800 includes initiating a test case at 802, and the layer-2 switch may be configured at 804. Commands used in the configuration process at 804 are generally shown in FIG. 3.

A data frame may be injected at 806. The processes at 806 may generally relate to those illustrated in FIG. 4. Proceeding to block 808, the method 800 may wait for egress frame verification before returning to block 806. The mirror switch may verify that the data frame egresses the appropriate ports and that the content of the data frame is correct.

Figure 9:
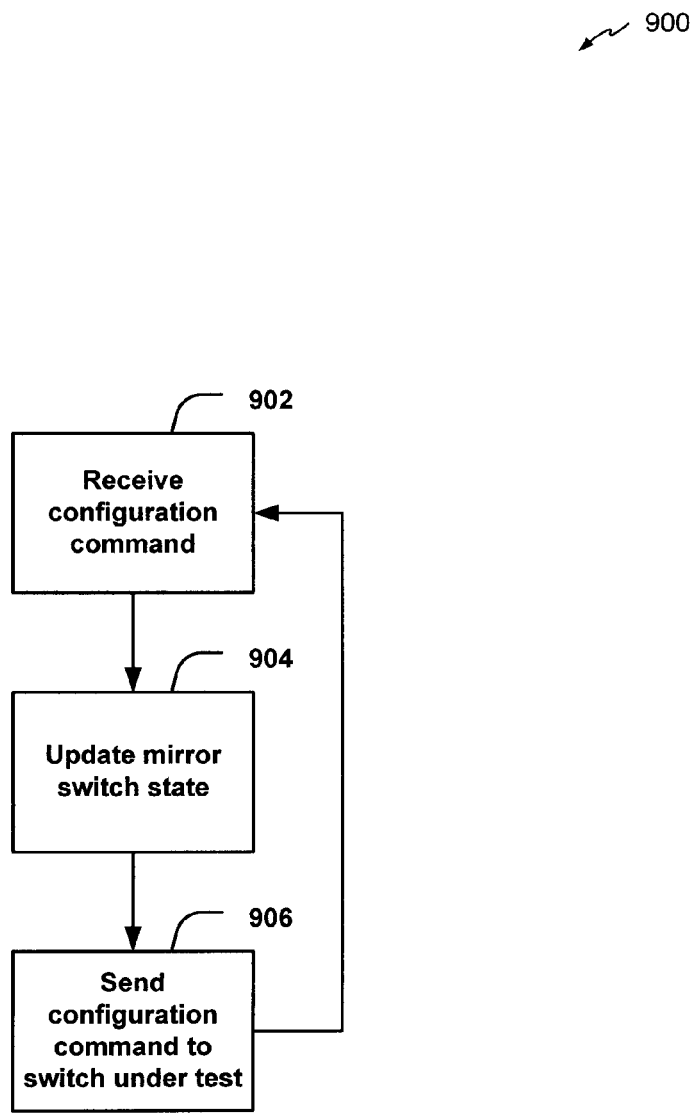
FIG. 9 is a flowchart of a method of configuring a switch of configuring a switch according to an embodiment.

FIG. 9 is a flowchart of an embodiment of a method of configuring a switch, such as the layer-2 switch 106 of FIG. 1. The processes of FIG. 9 may relate generally to the switch configuration processes of FIG. 3 and of 804 of FIG. 8. The method 900 includes receiving a configuration command, at 902. The switch state of the mirror switch may be updated, at 904. The method 900 may send at 906 a configuration command to a switch before returning to 902. Configuration commands may set configuration attributes (e.g., a switch state) of the switch.

Figure 10B:
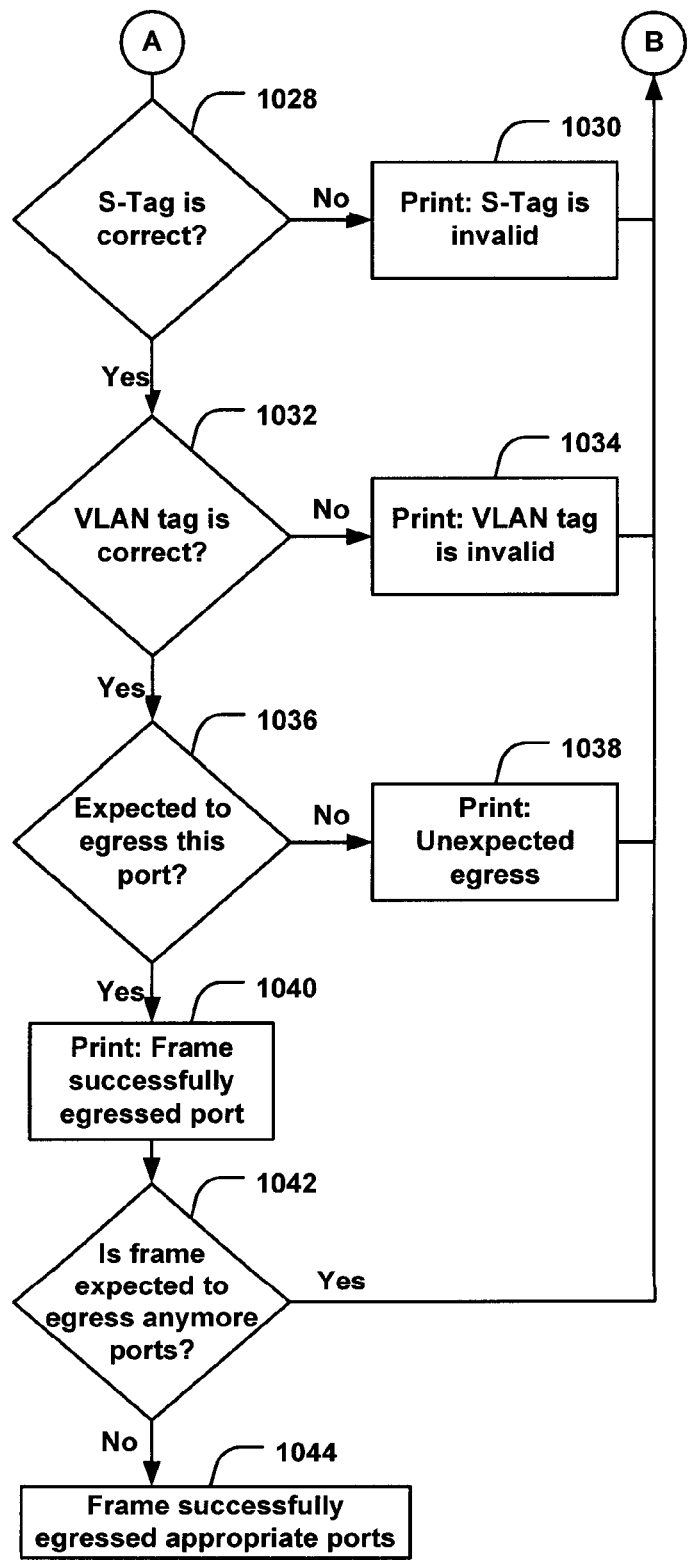

Referring to FIGS. 10*a* and 10*b*, a particular embodiment of a method 1000 of monitoring and analyzing data frame switching is illustrated as a flowchart. At 1002 of the flowchart, a data frame may be injected by the test case module into the mirror switch.

The method 1000 also includes the mirror switch calculating expected egress ports, at 1004. Determining which ports are expected to egress may be based on the switch configuration, e.g., the state of the switch) and on the type of frame (e.g., a broadcast frame, a multicast frame, a unicast frame, etc.).

Proceeding to block 1006, the mirror switch may append a sequence number to the data frame. The sequence number may be used to uniquely identify the data frame. When the data frame egresses a port, the sequence number may be analyzed to see if it is the expected sequence number. As discussed herein, other characteristics, such as the payload and the source address, may additionally be verified.

At 1008, the mirror switch may inject the data frame into an ingress port. For example, the test case module may instruct the mirror switch that the data frame should be injected. Proceeding to block 1010, the method 1000 may wait for the data frame to egress expected ports.

At 1012, the method 1000 determines when a timeout occurs. The timeout may be associated with a computing time expected for the data frame to be successfully forwarded. In an embodiment, a timeout may correspond to a sufficient time for potential frames to arrive for analysis. Where a timeout is detected at block 1012, an error may be returned at 1014. Where no timeout is alternatively detected, the mirror switch may determine at 1016 if a data frame with a matching sequence number has been received. When no data frame with a matching sequence number has been received, the mirror switch may initiate at 1018 an output message indicating an unknown data frame.

Returning to block 1016, where a data frame with a matching sequence number has been received, the mirror switch may determine at 1020 whether a payload is corrupted by comparing the payload to the payload of the originally injected frame. Where the payload is corrupted, the mirror switch may initiate at 1022 an output message indicating that the payload has been corrupted.

Where the payload is determined to be uncorrupted, the mirror switch may determine at 1024 if a destination address (DA) and the source address (SA) match. Where the destination address and the source address do not match, the mirror switch may indicate an error at 1026, and the method 1000 may return to 1010. Where the destination address and the source address match, the mirror switch may determine at 1028 if an S-Tag is correct. Where the S-Tag is not correct, an output indicating that the S-Tag is invalid may be generated at 1030. The S-Tag correctness may be determined using the known switch configuration.

Where the S-Tag is correct, the mirror switch may determine at 1032 whether the VLAN tag is correct. Where the VLAN tag is unexpected, an output indicating that the VLAN tag is invalid may be generated at 1034.

Where the VLAN tag is correct, the mirror switch may determine at 1036 whether a port was expected to be egressed. Where the port was not expected to be egressed, the mirror switch may indicate at 1038 that an unexpected egress has been detected. Where the expected port was egressed, the mirror switch may indicate at 1040 that the data frame has successfully egressed the port.

The mirror switch may determine at 1042 whether the data frame is expected to egress anymore ports. Where the data frame is expected to egress more ports, the method 1000 may return to 1010. Where the data frame is not expected to egress more ports, the data frame has successfully egressed appropriate ports and the method may end at 1044. An output report may be generated for analysis. For example, output files may include linked data that allows a tester to efficiently review highlighted portions of the layer-2 analysis.

Referring to FIG. 11, a particular embodiment of a method 1100 of determining expected egress ports is illustrated as flowchart. As such, an embodiment of the method 1100 may have application at 1004 of FIG. 10*b*. The mirror switch may initially determine at 1102 the expected egress ports. The determination may depend in part on the type of data frame.

The mirror switch may determine at 1104 whether a data frame is a unicast data frame. Where the data frame is a unicast data frame, the mirror switch may determine whether a destination cache hit occurs for the destination address of the data frame, at 1106. Where a destination address cache hit occurs, the method 1100 may determine at 1110 that the expected egress is a single port. Where a destination address cache hit alternatively does not occur, the method 1100 may at 1108 determine that the expected egress may be flooding to all VLAN member ports.

Where the data frame is not a unicast data frame, the mirror switch may determine whether the data frame is a broadcast frame, at 1112. When the data frame is a broadcast frame, the expected egress ports at 1114 may be to all VLAN member ports. Where the data frame is a multicast frame at 1116, the expected egress ports may be all ports belonging to a multicast group, at 1118.

At 1120, the method 1100 may determine whether Access Control List (ACL) rules affect the expected egress ports. When the ACL rules effect the expected egress ports, the mirror switch may adjust at 1122 the expected egress ports.

At 1124, the mirror switch may determine whether a private VLAN configuration affects the expected egress ports. A private VLAN may be subset of a VLAN. Where the private VLAN configuration affects the expected egress ports, the mirror switch may at 1126 adjust the expected egress ports according to the private VLAN configuration.

At 1128, the mirror switch may determine whether there is a port mirroring configuration. A port mirroring configuration may cause a frame to be mirrored additional, mirrored ports. Where there is a port mirroring configuration, the mirror switch may adjust at 1130 the expected egress ports to account for the additional mirrored ports. In this manner, the mirror switch of an embodiment may determine expected egress ports in a manner that takes into account the illustrated and other known switch configuration attributes.

One skilled in the art will appreciate that there are many more configuration commands that could affect frame forwarding and that are not illustrated in FIG. 11. For example, an embodiment may determine if VLAN filtering has been enabled. VLAN filtering may discard the frames, if the VLAN tag does not match the VLAN port membership. VLAN filtering may cause the expected egress ports to be adjusted. In another example, having the 802.1x port authorization enabled may also cause the expected egress ports to be adjusted. The 802.1x port authorization may discard the frame, if the port is not currently authorized.

FIG. 12 generally illustrates a block diagram of a computing apparatus 1200 consistent with an embodiment. For example, the apparatus 1200 may include software and hardware to monitor and verify switch frame delivery. The apparatus 1200, in specific embodiments, may include a computer, a computer system, a computing device, a server, a disk array, client computing entity, or other programmable device, such as a multi-user computer, a single-user computer, a handheld device, a networked device (including a computer in a cluster configuration), a mobile phone, a video game console (or other gaming system), etc.

The data processing system may include any device configured to process data and may encompass many different types of device/system architectures, device/system configurations, and combinations of device/system architectures and configurations. Typically, a data processing system will include at least one processor and at least one memory provided in hardware, such as on an integrated circuit chip. However, a data processing system may include many processors, memories, and other hardware and/or software elements provided in the same or different computing devices. Furthermore, a data processing system may include communication connections between computing devices, network infrastructure devices, and the like.

The data processing system 1200 is an example of a single processor unit based system, with the single processor unit comprising one or more on-chip computational cores, or processors. In this example, a processing unit 1206 may constitute a single chip with the other elements being provided by other integrated circuit devices that may be part of a motherboard, multi-layer ceramic package, or the like, to collectively provide a data processing system, computing device or the like. The processing unit 1206 may execute a test case module 1214 to monitor and verify frame switching in accordance with an embodiment.

In the depicted example, the data processing system 1200 employs a hub architecture including a north bridge and a memory controller hub (NB/MCH) 1202, in addition to a south bridge and an input/output (I/O) controller hub (SB/ICH) 1204. A processing unit 1206, a main memory 1208, and a graphics processor 1210 are connected to the NB/MCH 1202. The graphics processor 1210 may be connected to the NB/MCH 1202 through an accelerated graphics port (AGP).

In the depicted example, a local area network (LAN) adapter 1212 connects to the SB/ICH 1204. An audio adapter 1216, a keyboard and mouse adapter 1220, a modem 1222, a read only memory (ROM) 1224, a hard disk drive (HDD) 1226, a CD-ROM drive 1230, a universal serial bus (USB) port and other communication ports 1232, and PCI/PCIe devices 1234 connect to the SB/ICH 1204 through bus 1238 and bus 1240. The PCI/PCIe devices may include, for example, Ethernet adapters, add-in cards, and PC cards for notebook computers. PCI uses a card bus controller, while PCIe does not. ROM 1224 may be, for example, a flash basic input/output system (BIOS).

An HDD 1226 and a CD-ROM drive 1230 connect to the SB/ICH 1204 through the bus 1240. The HDD 1226 and the CD-ROM drive 1230 may use, for example, an integrated drive electronics (IDE) or serial advanced technology attachment (SATA) interface. A duper I/O (SIO) device 1236 may be connected to SB/ICH 1204.

An operating system runs on the processing unit 1206. The operating system coordinates and provides control of various components within the data processing system 1200 in FIG. 12. As a client, the operating system may be a commercially available operating system. An object-oriented programming system programming system may run in conjunction with the operating system and provide calls to the operating system from programs or applications executing on the data processing system 1200. The data processing system 1200 may be a symmetric multiprocessor (SMP) system including a plurality of processors in the processing unit 1206. Alternatively, a single processor system may be employed.

Instructions for the operating system, the object-oriented programming system, and applications or programs are located on storage devices, such as the HDD 1226, and may be loaded into main memory 1208 for execution by processing unit 1206. The processes for illustrative embodiments may be performed by the processing unit 1206 using computer usable program code. The program code may be located in a memory such as, for example, a main memory 1208, a ROM 1224, or in one or more peripheral devices 1226 and 1230, for example.

A bus system, such as the bus 1238 or the bus 1240 as shown in FIG. 12, may be comprised of one or more buses. The bus system may be implemented using any type of communication fabric or architecture that provides for a transfer of data between different components or devices attached to the fabric or architecture. A communication unit, such as the modem 1222 or the network adapter 1212 of FIG. 12, may include one or more devices used to transmit and receive data. A memory may be, for example, the main memory 1208, the ROM 1224, or a cache such as found in the NB/MCH 1202 in FIG. 12.

Those of ordinary skill in the art will appreciate that the embodiments of FIG. 12 may vary depending on the implementation. Other internal hardware or peripheral devices, such as flash memory, equivalent non-volatile memory, or optical disk drives and the like, may be used in addition to or in place of the hardware depicted in FIG. 12. Further, embodiments of the present disclosure, such as the one or more embodiments may take the form of a computer program product accessible from a computer-usable or computer-readable medium providing program code for use by or in connection with a computer or any instruction execution system. For the purposes of this description, a non-transitory computer-usable or computer-readable medium can be any non-transitory medium that can tangibly embody a computer program and that can contain or store the computer program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD). The processes of the illustrative embodiments may be applied to a multiprocessor data processing system, such as a SMP, without departing from the spirit and scope of the embodiments.

Moreover, the data processing system 1200 may take the form of any of a number of different data processing systems including client computing devices, server computing devices, a tablet computer, laptop computer, telephone or other communication device, a personal digital assistant (PDA), or the like. In some illustrative examples, the data processing system 1200 may be a portable computing device that is configured with flash memory to provide non-volatile memory for storing operating system files and/or user-generated data, for example. Essentially, the data processing system 1200 may be any known or later developed data processing system without architectural limitation.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to filmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a non-transitory computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories that provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. An apparatus comprising:
a test case device configured to transmit a data frame;
a first switch including a first verification port and a second verification port, wherein the first switch is configured to receive the data frame from the test case device and to append a sequence number to the data frame; and
a second switch including a first switch port coupled to the first verification port and a second switch port coupled to the second verification port, wherein each of the first and second switch ports is configured to receive the data frame from the first switch and output an egressed data frame to the first switch, wherein the first switch transmits the data frame into one of the first and second switch ports and determines, after receiving the data frame from the test case device and prior to sending the data frame to the second switch, at least one of the first and second verification ports to receive the egressed data frame from at least one of the first and second switch ports based on a switch state of the second switch, and wherein the first switch verifies at least a portion of content of the egressed data frame when a sequence number of the egressed data frame matches the sequence number of the data frame.

2. The apparatus of claim 1, further comprising a management link coupled between the first and second switch to configure the second switch based upon a command from the test case device.

3. The apparatus of claim 1, wherein the first switch determines a type of the data frame.

4. The apparatus of claim 3, wherein the determined type of the data frame is at least one of a multicast frame, a unicast frame, and a broadcast frame.

5. The apparatus of claim 1, wherein the first switch determines whether a destination address matches a source address of the egressed data frame.

6. The apparatus of claim 1, wherein ft the switch state of the second switch is set according to a configuration command.

7. The apparatus of claim 1, wherein the first switch verifies that an expected port received the egressed data frame.

8. The apparatus of claim 7, wherein the determination of the egress port is based on ft the switch state of the second switch.

9. The apparatus of claim 1, wherein the first switch compares a payload of the egressed data frame to a payload of the data frame.

10. The apparatus of claim 1, wherein the first switch is configured to implement a multicast snooper to learn a multicast group.

11. A method of analyzing a data frame switch operation, the method comprising:
receiving a data frame at a first switch from a test case device, wherein the first switch includes a first verification port and a second verification port;
configuring a second switch in a first switch state based upon a command from the test case device, wherein the second switch includes a first switch port and a second switch port, and wherein each of the first and second switch ports is configured to receive the data frame from the first switch and output an egressed data frame to the first switch;
determining at the first switch, after receiving the data frame from the test case device, at least one of the first and second verification ports of the first switch to receive the egressed data frame from at least one of the first and second switch ports of the second switch based upon a switch state of the second switch;
appending a frame sequence number to the data frame;
transmitting the data frame having the frame sequence number from the first switch to one of the first and second switch ports of the second switch;
receiving an egressed data frame on the at least one of the first and second verification ports from at least one of the first and second switch ports of the second switch; and
determining whether a sequence number of the egressed data frame matches the sequence number of the data frame.

12. The method of claim 11, further comprising determining whether the data frame has egressed from at least one switch port of the second switch.

13. The method of claim 11, further comprising determining a type of the data frame.

14. The method of claim 11, further comprising verifying at least a portion of the content of the egressed data frame.

15. The method of claim 14, further comprising determining a configuration attribute of the first switch.

16. The method of claim 11, further comprising determining the switch state of the second switch.

17. The method of claim 16, further comprising using the switching state to determine a runtime attribute associated with the egressed data frame.

18. The method of claim 11, further comprising ensuring that a packet rate for a configured flow does not exceed a configured rate.

19. The method of claim 11, further comprising a management link coupled between the first and second switch to configure the second switch based upon a command from the test case device.

20. A program product, comprising:
program code configured to:
receive a data frame at a first switch from a test case module, wherein the first switch includes a first verification port and a second verification port;
configure a second switch in a first switch state, wherein the second switch includes a first switch port and a second switch port, and wherein each of the first and second switch ports is configured to receive the data frame from the first switch and output an egressed data frame to the first switch;
determine at the first switch, after receiving the data frame from the test case device, at least one of the first and second verification ports of the first switch to receive an egressed data frame from at least one of the first and second switch ports of the second switch based upon a switch state of the second switch;
appending a frame sequence number to the data frame;
transmit the data frame having the frame sequence number from the first switch to one of the first and second switch ports of the second switch;
receive an egressed data frame on at least one of the first and second verification ports from at least one of the first and second switch ports of the second switch; and
determine whether a sequence number of the egressed data frame matches the sequence number of the data frame, and
a computer readable storage device bearing the program code.

* * * * *